US005098756A

United States Patent [19]

Henderson et al.

[11] Patent Number: 5,098,756

[45] Date of Patent: Mar. 24, 1992

[54] ELASTIC SELF-EXTINGUISHING STRAP MATERIAL

[76] Inventors: Mark P. Henderson; Timothy A. Sands; John A. Mortensen, all of c/o C. M. Offray & Son, Inc. Rte. 24, Box 601, Chester, N.J. 07930-0601

[21] Appl. No.: 301,149

[22] Filed: Jan. 25, 1989

[51] Int. Cl.[5] .................... G02B 5/128

[52] U.S. Cl. .................... 428/36.3; 428/116; 428/119; 428/225; 428/231; 428/246; 428/267; 428/257; 428/252; 428/913; 428/920; 428/921; 428/36.4; 220/88.1; 54/58

[58] Field of Search .................... 428/225, 231, 921, 267, 428/257, 252, 36.3, 913, 36.4, 116, 119, 246; 220/88.1; 54/58

[56] References Cited

U.S. PATENT DOCUMENTS

| | | | |
|---|---|---|---|
| 3,013,588 | 12/1961 | Klingberg | 428/920 |
| 4,755,407 | 7/1988 | Mortensen et al. | 428/921 |
| 4,865,906 | 9/1989 | Smith, Jr. | 428/224 |

*Primary Examiner*—George F. Lesmes
*Assistant Examiner*—Beverly A. Pawlikowski
*Attorney, Agent, or Firm*—Mark T. Basseches; Paula T. Basseches

[57] ABSTRACT

A self-extinguishing fire resistant elastic strap material is disclosed, as is a method of fabricating the same. The material is comprised of a tubular fabric of fireproof yarns having a hollow core, elastic and hence combustible yarns being disposed entirely within the core, the elastic yarns being frictionally clampingly engaged at spaced positions to the surrounding fabric, the elastic yarns being tensioned in the formed condition of the fabric to effect foreshortening of the fabric when the tension in the elastic yarns is relaxed.

10 Claims, 3 Drawing Sheets

FIG. 7
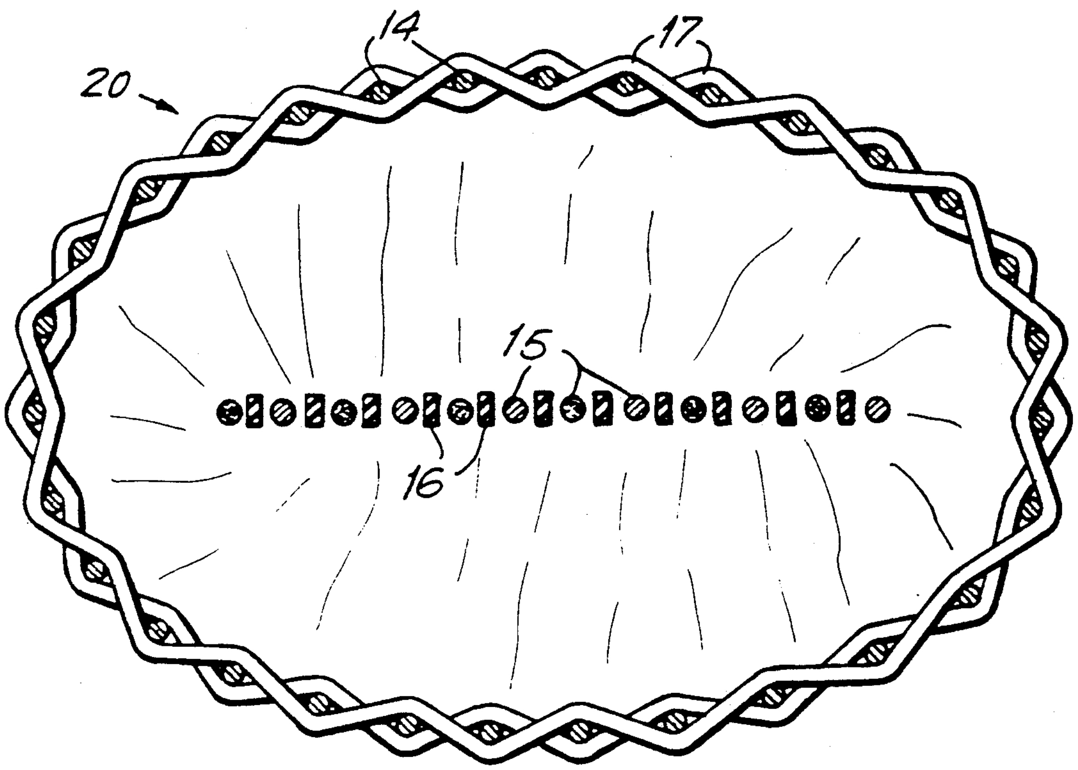
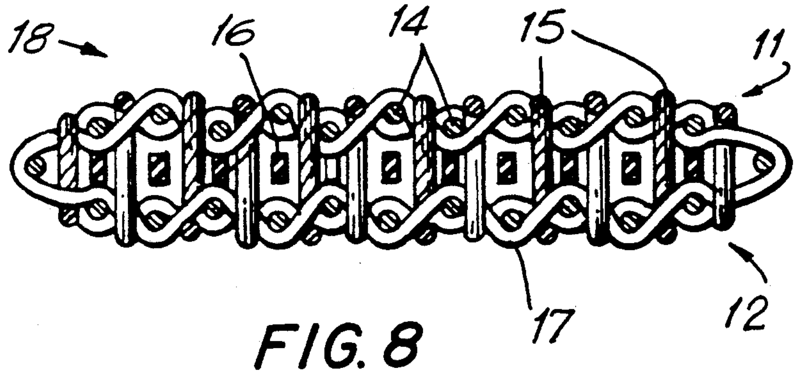
FIG. 8

ELASTIC SELF-EXTINGUISHING STRAP MATERIAL

BACKGROUND OF THE INVENTION

1. Field of the Invention

The present invention is directed to elastic strap material and specifically to a fire resistant, self-extinguishing strap material especially adapted to be used in conjunction with equipment likely to be exposed to flame environments, such as firemen's helmets, breathing masks, aircraft accessory pockets, etc.

2. The Prior Art

Many types of equipment which must necessarily be exposed to high temperature conditions and direct flame environments, such as firemen's masks. mine safety equipment and the like, desirably are provided with elastic retaining straps to facilitate donning and removing the equipment. Similarly, in commercial aircraft it is desirable to provide elastic strap components for use in connection with a variety of accessories while at the same time it is important that combustible items be minimized.

Elastic strap materials heretofore known have inevitably been supportive of combustion since such materials necessarily employ elastomeric compositions which burn readily.

Conventional attempts to make fire resistant elastic strap materials have involved combining in a woven or knitted fabric, elastomeric yarns and yarns of fire resistant material. such as Nomex (a registered trademark of DuPont Corporation) which is an aramid fiber which maintains its load carrying capacity at relatively high temperatures, does not burn or melt, but degrades at about 700° F. (371° C.)

Prior art strap material of the type described has proven ineffective in that the elastomeric components readily burn despite their combination with fireproof yarns.

We have discovered that the deficiencies of prior art elastic strap materials are engendered by the fact that in all such structures some portion or portions of the elastomeric and hence combustible components are exposed to oxygen in the atmosphere. Such exposure results from a fabric structure wherein loops of the elastomer providing elasticity are present at the surface of the fabric and by the necessity, in elastic fabric structures heretofore known, to weave or knit the non-elastomeric fibers loosely so that such fiber yarns do not inhibit or prevent stretching of the elastomeric components. The presence of elastomers at the surface of the strap results in combustion, liquefaction and wicking of the molten elastomer, and the loosely knit fabric promotes combustion by allowing oxygen to penetrate throughout the fabric weave.

No elastomeric containing fabric heretofore known has been capable of exhibiting a significant resistance to combustion.

SUMMARY OF THE INVENTION

The present invention may be summarized as directed to an elastic strap material which is not supportive of combustion and is self-extinguishing.

The invention is directed more particularly to an elastomer containing fabric structure especially adapted to be used as an elastic strap wherein the combustible nature of the elastomer is counteracted by the manner in which the same is integrated into the fabric.

Still more particularly, the invention is directed to an elastic strap material which includes combustible elastomeric yarns, the yarns being so integrated into the material that no portion thereof is exposed to the atmosphere, the structure of the strap being such that exposure to heat tends to cause the combustible elastomeric components to retract into the interior of the hollow strap providing a low oxygen environment.

Still more particularly, the invention is directed to an elastic, self-extinguishing strap fabric which is woven into a tubular configuration, the elastomeric components thereof being entirely encompassed within the core of the tubular configuration but having increments secured at regularly spaced intervals against longitudinal displacement relative to the tubular fabric. The elastomeric ends are integrated into the fabric in the course of weaving and are maintained in a longitudinally elongated and distended condition during the weaving process whereby, following release of tension in the elastomeric ends, the strap material tends to foreshorten in the areas between the securing increments.

The resulting material comprises a readily stretchable elastic strap material including a sequence of expanded pockets separated by areas of connection to the elastomeric yarns.

When a fabric of the type described is subjected to high heat or combustion influences which ignite components of the elastomer, the ignited elastomer will foreshorten and withdraw into the surrounding tunnel of fireproof yarns and thus be deprived of oxygen and self-extinguish.

It is accordingly an object of the invention to provide a self-extinguishing elastic fire resistant strap material and method of making the same.

BRIEF DESCRIPTION OF THE DRAWINGS

FIGS. 7 and 8 are vertical sections taken on the lines 7—7 and 8—8, respectively, of FIG. 6.

Referring now to FIG. 1, there is disclosed a strap material 10 in accordance with the invention, the material being illustrated in its longitudinally distended as-woven condition, a condition to which it would be returned when the strap is tensioned in use.

The structure of the fabric will be more readily understood from an inspection of the diagrammatic views, namely FIGS. 2-4 and 6-8.

Figure 2:
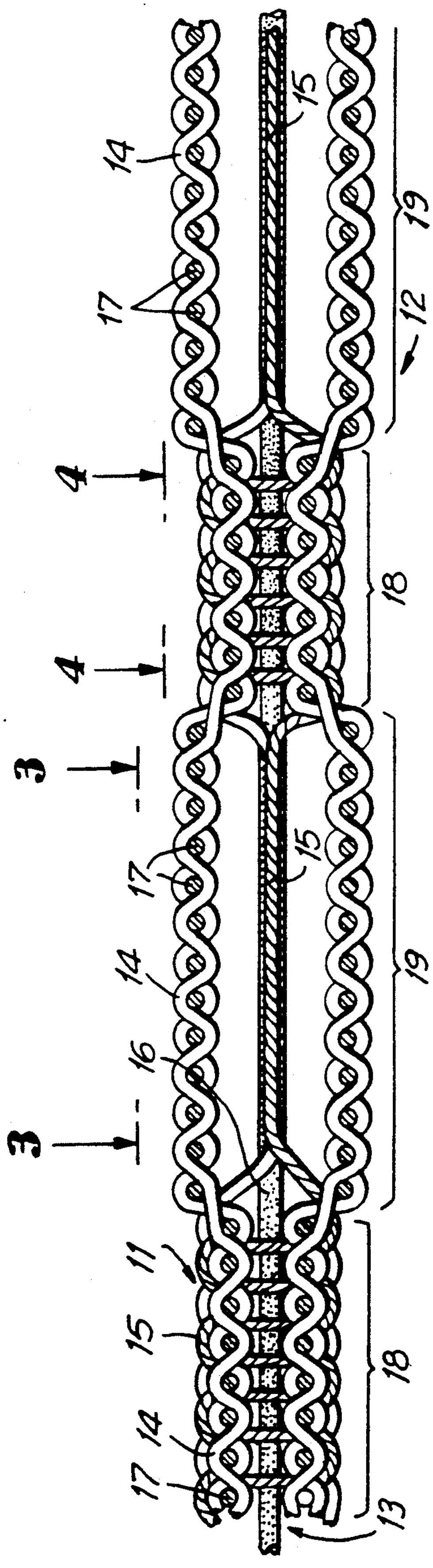
FIG. 2 is a magnified vertical section taken on the line 2—2 of FIG. 1.

In FIG. 2 a section of the strap material is shown in its as-woven condition. The strap material is woven into a tubular configuration including an upper layer 11, a lower layer 12, and a hollow, longitudinally directed core defined between the layers 11 and 12.

The warp ends of the fabric are comprised of ground ends 14 and binder ends 15 of fireproof yarns, i.e. Nomex. A plurality of elastomeric yarn ends 16, illustratively of neoprene and typically encapsulated by a braided covering layer (not shown), extend axially within the core 13. A series of picks or fills 17 is woven through the ground and binder ends to form the fabric.

As best seen in FIG. 2, the weave is effected to provide spaced increments 18 wherein the ground and binder ends are frictionally linked to the elastomeric ends 16, leaving intervening portions or expansion zones 19 between increments 18 wherein the elastomeric yarns 16 are free to move relative to the adjacent fabric components.

More specifically, the binder ends 15, picks 17 and ground ends 14 in the clamping increments 18 of the upper and lower layers 11, 12 are locked to each other and tightly about the elastomeric ends 16 whereby the elastomer ends 16 are frictionally locked against axial movement relative to the remainder of the fabric in such clamping increments 18.

In the expansion zones or portions 19 the picks 17 extend solely through the ground ends 15 and the picks do not traverse the core 13, whereby the upper and lower layers 11, 12 are unconnected in the zones 19. In such zones the binder ends 15 run essentially parallel to the elastomeric ends (in the tensioned or as-woven condition of the fabric).

As noted, the elastomeric ends are woven while the same are maintained in a longitudinally stretched and distended condition. Upon release of tension, the elastomeric ends 16 return to their foreshortened condition, as shown in FIG. 6, with the result that the strap material is caused to foreshorten, resulting in the formation of outwardly extending pockets 20 in the areas between increments 18.

Figure 3:
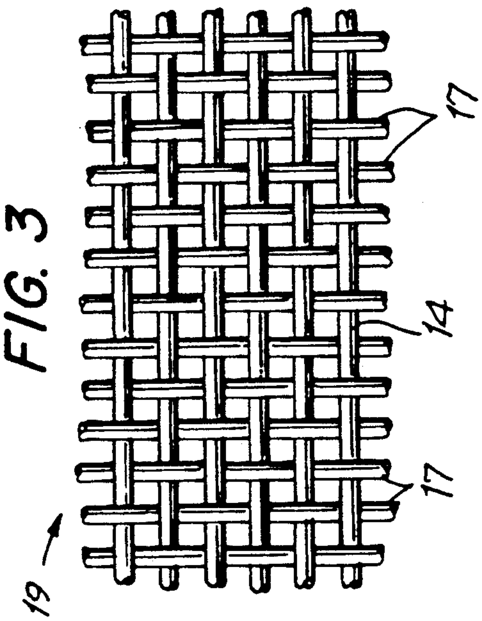
FIG. 3 is a plan view of a section of the strap material within the area defined by the arrows 3—3, FIG. 2.
Figure 1:
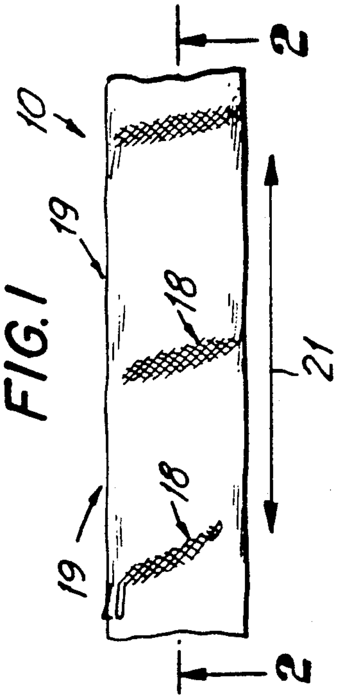
FIG. 1 is a top plan view of a length of strap material in accordance with the invention in distended condition.

FIG. 1 discloses the strap material in the stretched or distended (as-woven) condition, with the high yarn density clamped increments being shown at 18 and the lower yarn density expansion zones or portions being shown at 19. The arrow 21 illustrates the direction of expansion.

Figure 5:
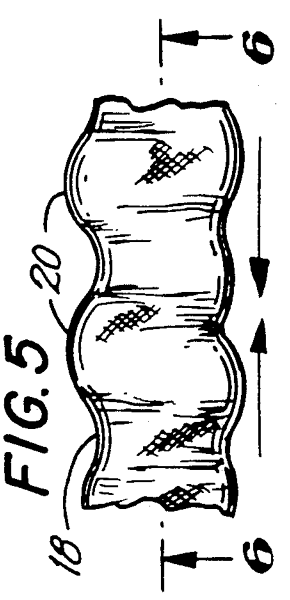
FIG. 5 is a view similar to FIG. 1 showing the fabric in the untensioned condition thereof.

In FIG. 5 the material is shown in its fore-shortened or unstressed condition, the pockets 20 formed by zones 19 being shown as deflected from the center axis of the fabric, whereby the fabric assumes a puckered appearance.

Figure 6:
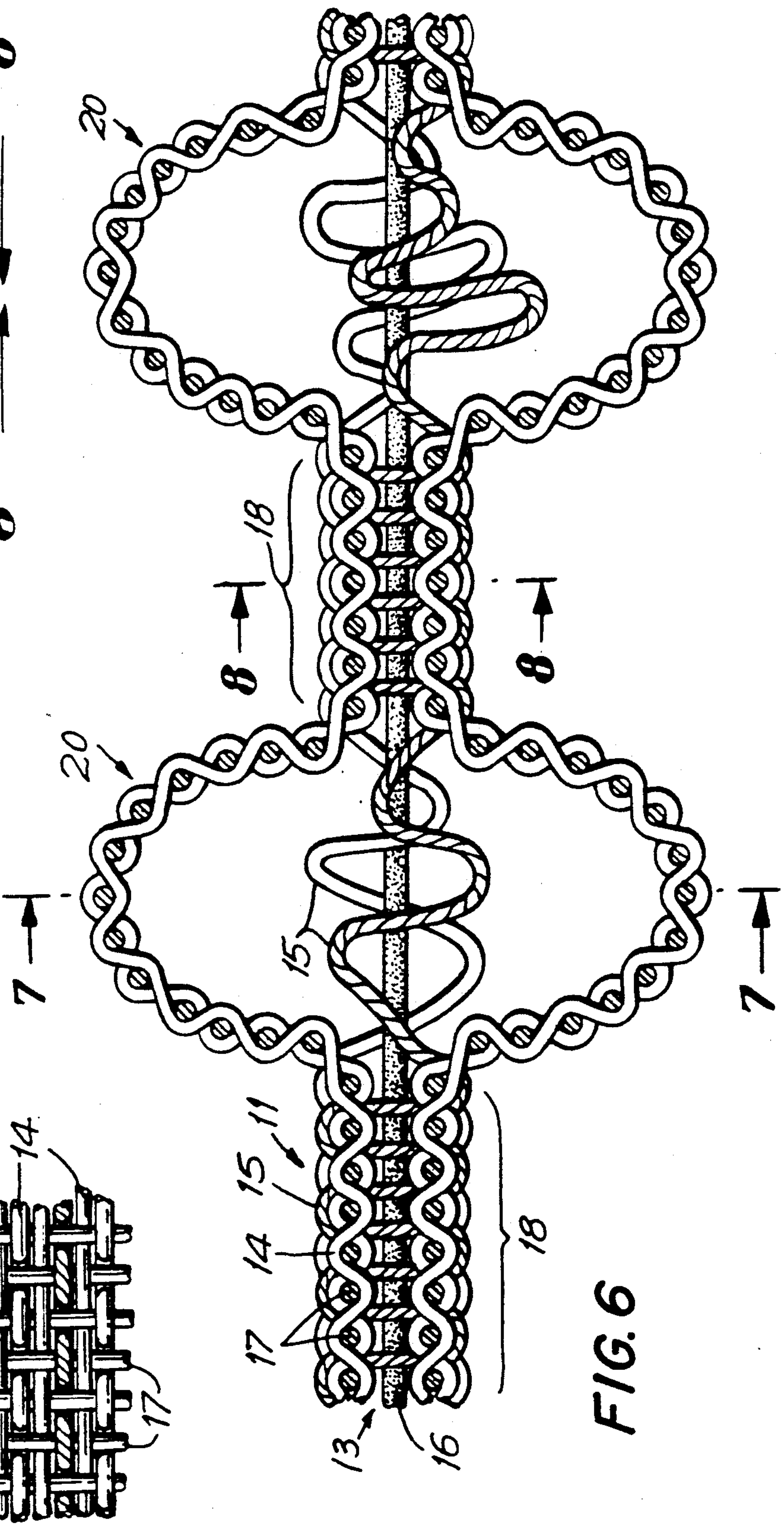
FIG. 6 is a magnified vertical section taken on the line 6—6 of FIG. 5.
Figure 4:
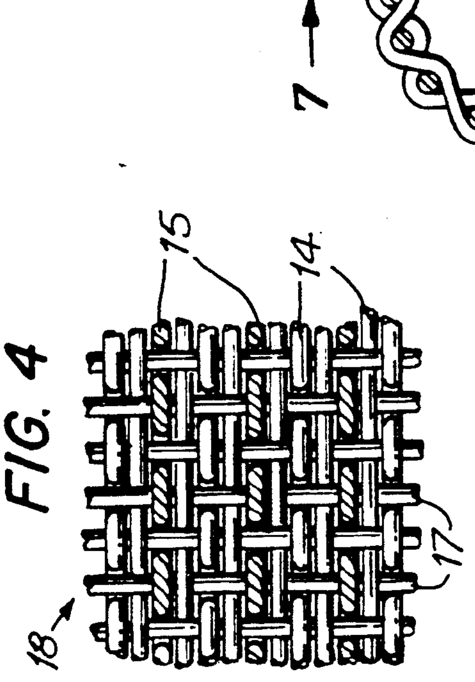
FIG. 4 is a plan view of a section of the strap material of FIG. 2 within the area defined by arrows 4—4 of FIG. 2.

As best seen in FIGS. 6 and 7, in the foreshortened or relaxed condition of the material the binder ends 15 are slack and will be deflected from the axis of the fabric. When the fabric is stressed longitudinally, as shown in FIG. 2, the binder ends 15 will lie parallel to the elastomeric ends 16.

Thus it will be apparent that the binder ends act as a check against the application of unduly high axial forces to the elastomeric ends, which forces would tend to rupture such ends or cause slippage of such ends relative to the increments 18.

In FIG. 7 the configuration of the fabric in one of the pockets 20 is diagrammatically disclosed, whereas in FIG. 8 there is disclosed a sectional configuration of the fabric in a clamping zone 18 thereof.

In the diagrammatic views, the spacing of the respective yarns has been exaggerated for purposes of clarity of illustration, it being appreciated that in the clamp zones 18 particularly the yarns are tightly bunched to effect the desired frictional locking of the elastomeric ends.

The clamping action in the increments 18 is augmented by the fact that, due to the distension of the elastomeric yarns during manufacture, the diameter of the yarns is reduced and, thus, when the tension is removed from the elastomeric yarns the same tend to expand transversely, increasing the frictional connection of such yarns to the other yarns.

The strap material is woven in extended lengths and increments of any desired length may be severed from the whole in accordance with the length of strap desired.

Without limitation but by way of example only, a representative strap material has been formed wherein the clamping increments 18 in the as-woven (distended) condition occupy from about 3/16 to about $\frac{1}{3}$ of the total longitudinal extent of the strap material.

Strap material in accordance with the invention may be elongated to up to about twice the length of a relaxed sample.

Experimentally, in order to establish the self-extinguishing properties of the material, the end of a severed length of material has been subjected to flame. The elastomeric ends, particularly if the sever is effected across a pocket area, will burn briefly until the same retract into the interior of the tunnel and are thus deprived of oxygen and self-extinguish.

The self-extinguishing characteristics are particularly effective where the material is in distended or partially distended condition when subject to high heat or flame since the combustible elastomeric components then liquefy and disengage from the clamp areas and rapidly retract into the tunnel and away from the heat source.

As will be apparent to those skilled in the art, there is disclosed a novel, self-extinguishing elastic strap material especially suitable for use in environments wherein the same is likely to be subjected to high heat and/or open flame.

There is also disclosed a novel method of forming strap material of the type described which includes effecting the weaving process during a distension of the elastomeric yarns, the weave being of a type which alternately embraces and clamps the stretched elastomer and provides between the clamping increments areas which are free of connection to the elastomer and thus permit stretching thereof.

Specifically, while weaving is considered to be a preferred method of forming the strap material of the instant invention, it is considered to be well within the skill of persons versed in the knitting art and/or the art of fabricating non-woven (felt or adhesively bonded, etc.) fabrics to adapt the concepts herein disclosed to such known alternate fabric forming techniques.

The essence of the instant invention is thus considered to reside in the concept of providing, by any fabricating means, a strap fabric comprised of a tubular tunnel-like exterior of fireproof yarns which entirely encompasses a flamable elastomeric yarn or band, the elastomer being longitudinally distended in the as-formed condition of the fabric and secured to the interior of the tunnel at regularly spaced sequential increments and being unconnected to the fireproof yarns at expansion zones intervening between such increments, where, upon exposure to flame the flammable yarns draw back into the interior of the tunnel and self extinguish. The fireproof properties of the strap material is further augmented by the fact that the foreshortening of the fabric by the tensioned elastomer tends to compress or close the spaces between the yarns forming the shell whereby the passage of oxygen through the fabric body is minimized, thus to prevent combustion interiorly of the shell.

As will be evident to the skilled worker, numerous variations in details of construction may occur after familiarization with the instant disclosure. Accordingly, the invention hereof is to be broadly construed within the scope of the appended claims.

Having thus described the invention and illustrated its use, what is claimed and is desired to be secured by Letters Patent is:

1. An elastic, self-extinguishing fire resistant strap material comprising a tubular woven fabric of fireproof yarns, said fabric including upper and lower layers and an axially extending hollow core, a plurality of combustible elastomeric yarn ends disposed entirely within said core and extending axially of said fabric, said elastomeric ends being tensioned into axially elongated condition in the aswoven condition of said fabric, regularly spaced apart sequential increments of said upper and lower layers being woven into interconnected relation with each other and clampingly engaging said elastomeric ends against axial movement relative to said increments, the portions of said upper and lower layers between said increments being free of interconnection to each other and to said elastomeric ends, said portions, upon release of said tension, being foreshortened and deflected outwardly to define pockets encompassing said elastomeric ends,

2. Fire resistant strap material in accordance with claim 1 wherein said fireproof yarns include ground ends, binder ends and picks, said binder ends linking the picks of said upper and lower layers in said increments and being unconnected to said layers in the areas of said portions.

3. Fire resistant strap material in accordance with claim 2 wherein said binder ends in the areas intervening between said increments are substantially coextensive with the length of said elastomeric yarn ends in said intervening areas in said as-woven condition whereby, upon distension of said strap material, said binder ends in said intervening areas limit the amount by which said elastomeric ends may be distended.

4. A fire resistant strap material in accordance with claim 2 wherein said fireproof yarns are comprised of aramid fibers.

5. A fire resistant strap material in accordance with claim 2 wherein from about 3/16 to ⅓ of the longitudinal extent of said strap material in the aswoven condition is comprised of said increments.

6. A fire resistant strap material in accordance with claim 5 wherein the transverse center lines of adjacent said increments in the as-woven condition of said strap material are spaced apart in the range of from about 3/4" to about 1¾".

7. A fire resistant strap material in accordance with claim 5, further characterized in that said material in the tension released condition thereof is subject to a maximum elongation by a factor from about 1½ to 1 to 2 to 1.

8. An elastic, self-extinguishing fire resistant strap material comprising a tubular fabric exterior shell of fireproof yarns defining a hollow core, combustible elastic means deposed entirely within said core, the length of said elastic means in the unstressed condition being substantially less than the length of said fabric shell in the unstressed condition, regularly spaced apart sequential increments of said elastic means being secured to interior surfaces of said shell, the portions of said shell between said increments being free of connection to said elastic means, said elastic means having been connected to said shell at said increments while tensioned into axially elongated condition whereby, upon release of said tension, said increments are drawn toward each other axially to foreshorten said shell.

9. Strap material in accordance with claim 8 wherein said fabric is a knitted fabric and said elastic means comprise elastomeric yarns engaged by portions of the yarns defining the body of said fabric.

10. Strap material in accordance with claim 8 wherein said fabric is a non-woven fabric and said elastic means is adhesively bonded to said fabric at said increments.

* * * * *